United States Patent
Hill

(10) Patent No.: US 8,503,999 B2
(45) Date of Patent: *Aug. 6, 2013

(54) METHOD FOR SIMULTANEOUS COMMUNICATIONS MANAGEMENT

(75) Inventor: Thomas C Hill, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,194

(22) Filed: Jun. 12, 2012

(65) Prior Publication Data

US 2012/0257001 A1    Oct. 11, 2012

Related U.S. Application Data

(63) Continuation of application No. 11/104,080, filed on Apr. 12, 2005, now Pat. No. 8,219,073.

(60) Provisional application No. 60/639,867, filed on Dec. 28, 2004.

(51) Int. Cl.
*H04M 3/42* (2006.01)

(52) U.S. Cl.
USPC ........................................ 455/416; 348/14.07

(58) Field of Classification Search
USPC .............. 455/566; 348/14.01–14.03; 370/338
See application file for complete search history.

(56) References Cited

U.S. PATENT DOCUMENTS

| | | | |
|---|---|---|---|
| 5,838,384 A | | 11/1998 | Schindler et al. |
| 5,867,223 A | | 2/1999 | Schindler et al. |
| 5,870,149 A | | 2/1999 | Comroe et al. |
| 6,014,689 A | | 1/2000 | Budge et al. |
| 6,097,441 A | | 8/2000 | Allport |
| 6,317,776 B1 | * | 11/2001 | Broussard et al. ............ 709/204 |
| 6,567,984 B1 | | 5/2003 | Allport |
| 2001/0047300 A1 | * | 11/2001 | Takashima et al. ............. 705/14 |
| 2003/0053434 A1 | | 3/2003 | Chow et al. |
| 2003/0189637 A1 | * | 10/2003 | Nakade et al. ............. 348/14.08 |
| 2003/0197785 A1 | * | 10/2003 | White et al. ............. 348/207.99 |
| 2004/0204126 A1 | * | 10/2004 | Reyes et al. ................... 455/566 |
| 2005/0086105 A1 | * | 4/2005 | McFadden et al. ............. 705/14 |
| 2006/0098085 A1 | * | 5/2006 | Nichols et al. ............. 348/14.07 |

* cited by examiner

*Primary Examiner* — Marcos Batista

(57) ABSTRACT

A method for presenting multiple communications in a wireless communication device (100) comprising presenting (308) a plurality of communications concurrently with at least one output device of a wireless communication device. The method further comprises formatting the plurality of communications on the at least one output device as a function of the number of communications of the plurality of communications and of at least one condition and a function of a communication characteristic.

15 Claims, 3 Drawing Sheets

METHOD FOR SIMULTANEOUS COMMUNICATIONS MANAGEMENT

CROSS REFERENCE TO RELATED APPLICATIONS

This application is a continuation of U.S. application Ser. No. 11/104,080, filed Apr. 12, 2005, which is incorporated by reference for all purposes. U.S. Ser. No. 11/104,080 claims priority to U.S. provisional application Ser. No. 60/639,867, filed Dec. 28, 2004, which is also incorporated herein for all purposes.

FIELD OF THE INVENTION

The present invention relates generally to the presentation of multiple communications on a single device and more particularly management of multiple communication data streams on a single output device.

BACKGROUND OF THE INVENTION

The recent advances in data throughput for mobile wireless communication devices provides a myriad of opportunities to add functionality and provide new services not possible with slower data rate equipment. Consequently, the data rates necessary to support streaming video and voice simultaneously are being realized thereby allowing the video functionality in portable wireless handsets.

Some devices provide video streaming both to and from the device using a display to present the video image and a built-in or attached camera to store and then transmit the images to the intended recipient. With lower data rate devices, small file size images and video clips may be received and or transmitted by the wireless commutation device. Third generation wireless devices provide video streaming to and from a single intended recipient.

Other devices provide dispatch operation mode for voice interchange in two way radio, half duplex or simplex format that allows for two-way conversations but one user at a time. One example has been termed a push to talk mode similar to a walkie-talkie where the push of a button opens the microphone for transmission. However these communication modes are available for voice and do not provide full duplex communications.

Management however of multiple communication streams such as during group call or a conference all is limited by the size of the display and the formats in which the communications are being presented. Presenting communications to the user when multiple formats, such as a combination of voice only and video communications is used, makes presenting the communication s awkward as displays on portable deices limit the amount of information that may be presented to the user at a given time.

What is needed is a method for presenting multiple communications on a single device that is intuitive and easy to determine which communication stream has the active conversation. The various aspects, features and advantages of the disclosure will become more fully apparent to those having ordinary skill in the art upon careful consideration of the following Detailed Description thereof with the accompanying drawings described below.

BRIEF DESCRIPTION OF THE DRAWINGS

The various aspects, features and advantages of the present invention will become more fully apparent to those having ordinary skill in the art upon careful consideration of the following Detailed Description of the Invention with the accompanying drawings described below.

Figure 1:
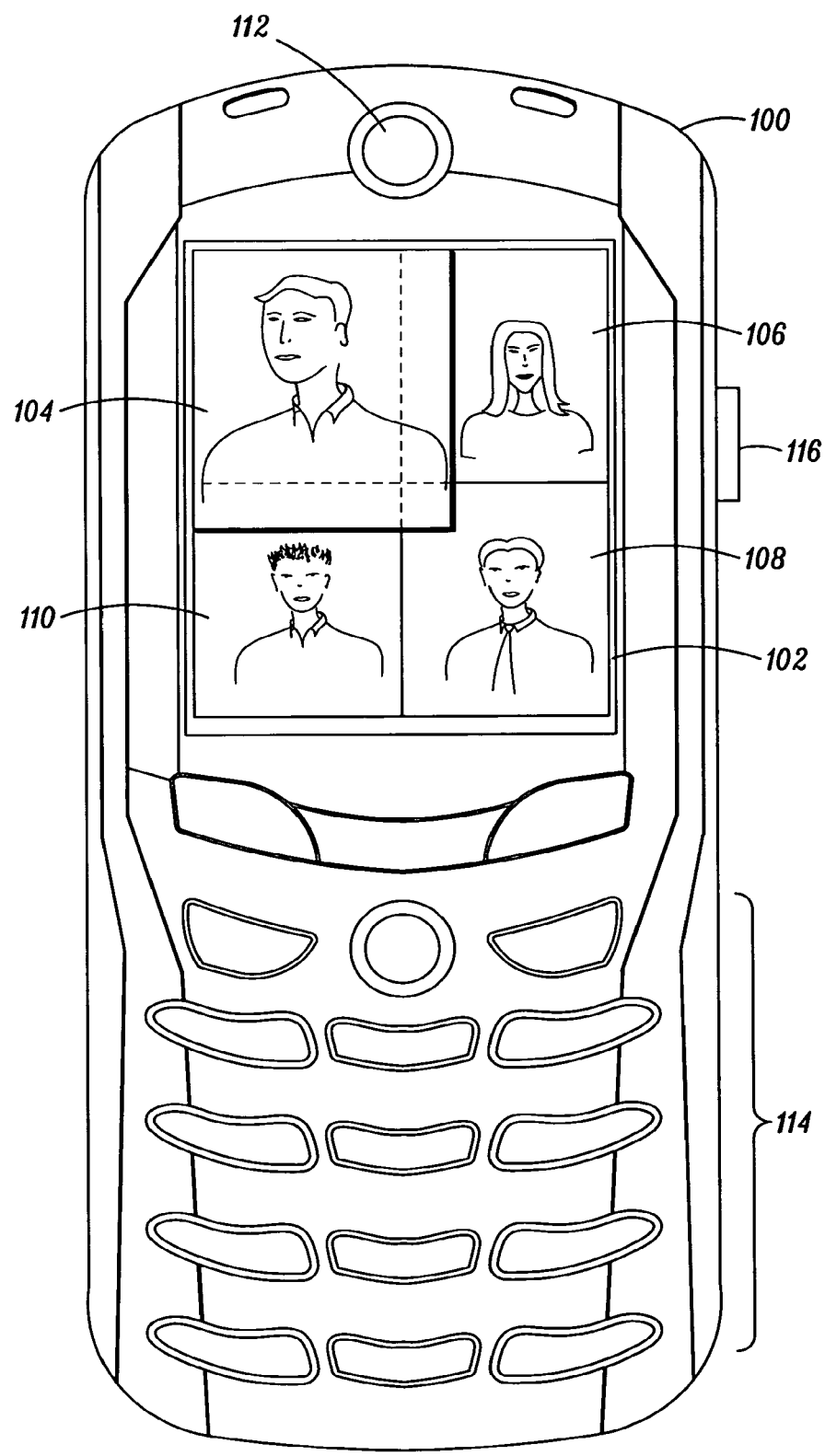
FIG. 1 is an exemplary electronics device having a user interface presenting communications thereon.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail the particular data management method and apparatus in accordance with the present invention, it should be observed that the present invention resides primarily in combinations of method steps and apparatus components related thereto. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

A method and apparatus for presenting communications in a wireless communication device is disclosed. The method comprises presenting a plurality of communications concurrently with at least one output device of a wireless communication device. The plurality of communications may be a plurality of video streams of a conference call for example which are concurrently received at the device. The method further comprises formatting the plurality of communications on the at least one output device as a function of the number of communications of said plurality of communications and of at least one condition.

FIG. 1 is an exemplary communication device 100 having a display 102 for presenting communications top the user. In this exemplary embodiment, four streaming images are presented on the display 102 in real time. A first video 104 a second video 106, a third video 108 and a fourth video 110. In this exemplary embodiment, the video images are presented in a four square or 2.times.2 matrix arrangement however the first video 104 is formatted with a larger size than the other three video images in response to a characteristic of at least one of the video images or condition. Also in this embodiment, there may be more or less than four participants in the communication or group call type event but the exemplary streaming of four videos is shown. Other participants, not shown in video format in the call may only be communicating by voice. The other participants may not be displayed as configured by the user i.e. the sender may override configuration setting of the receiving device as discussed above. For example, the sender can select an option configuring the communication to be presented by the receiving device in audio only format even though the receiving device is requesting to present the communication as a video. The method would comprise that the sending device determines the format for viewing on the receiving device.

The exemplary electronic device 100 comprises a housing portion 110 and a user interface that comprises at least the display 102 and a speaker 112. The user interface may also comprise an input device such as a keypad 114 or touch pad or the like. In the exemplary embodiment, the electronics device 100 is a wireless communications handset such as a cellular radiotelephone. The display 102 may be an output only display capable of presenting video format information or a combination input output device such as a touch screen display. One input device may be a singe button 116 to activate communications with intended recipients of the communication or a full QWERTY keypad for example. The single button 116 may be a push-to-talk or push-to-video button that initiates or activates communications. When the push-to-video button is depressed, the conference call is initiated. While the plurality of communications is received the push-to-video button may be used to perform a mute/un-mute for example.

The electronic device 100 described herein is a representation of the type of wireless communication device that may benefit from the present invention. However, it is to be understood that the present invention may be applied to any type of hand-held or portable electronic device including, but not limited to, the following devices: radiotelephones, cordless phones, paging devices, personal digital assistants, portable computers, pen-based or keyboard-based handheld devices, remote control units, portable media players such as an audio player (such as an MP3 player) and the like. Accordingly, any reference herein to the device 100 should also be considered to apply equally to other hand-held or portable electronic devices.

Figure 2:
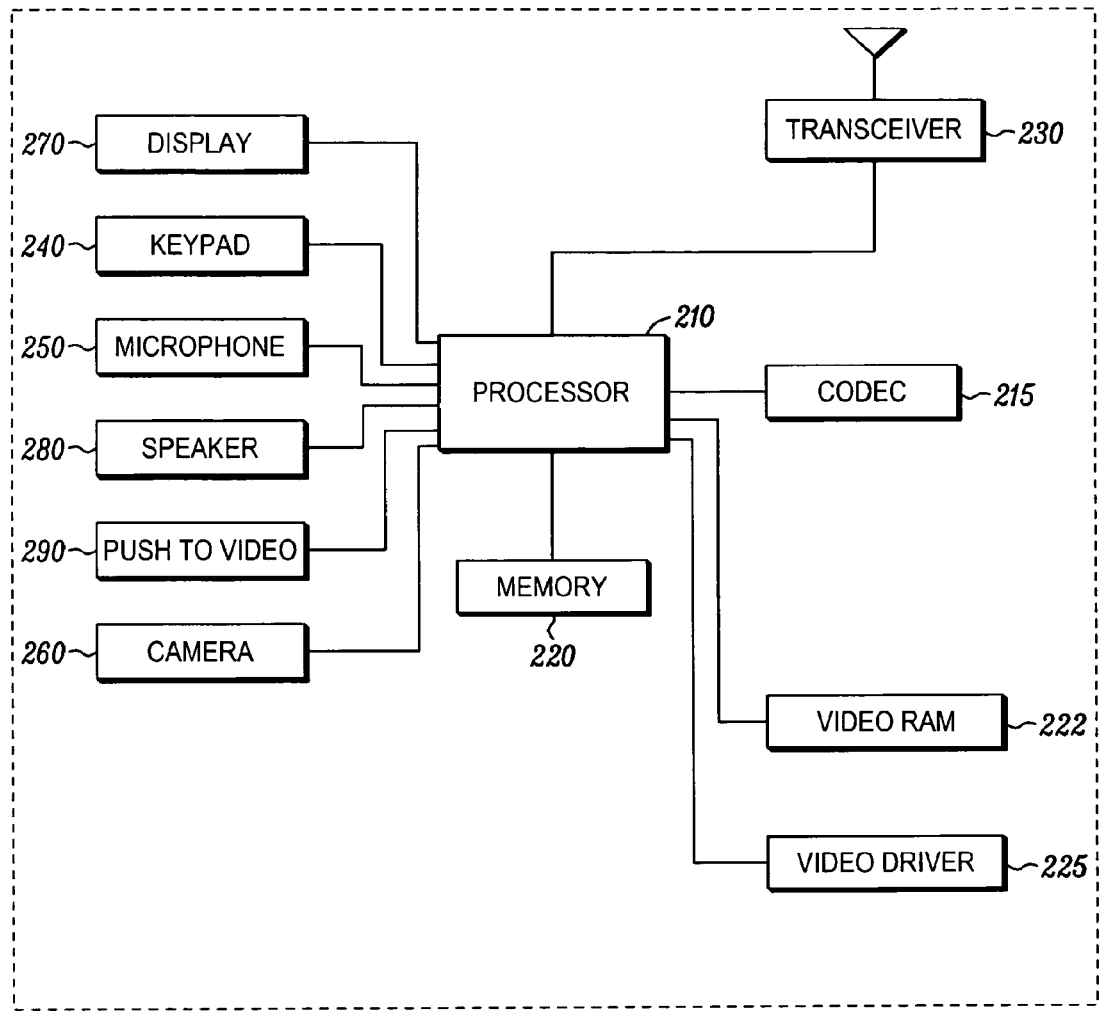
FIG. 2 is an exemplary wireless communications handset schematic block diagram.

FIG. 2 is an exemplary wireless communications handset schematic block diagram 200 comprising generally a processor 210 coupled to memory 220, for example RAM, ROM, EPROM, etc. The exemplary wireless handset also includes a radio transceiver 230, inputs for example a keypad 240, a microphone 250 and video inputs such as a camera 260, and outputs, for example a display 270 for visual output, a speaker 280 for audio output, and other ports, for example power, audio, etc., all of which are coupled to the processor 210. The keypad 240 and the single button 290 are coupled to the controller 210.

In addition, the handset may further comprise video RAM 222, a video driver 225 for processing incoming and outgoing multimedia data. A camera 260 is also coupled to the processor 210 to bring image data, in still or moving format. A coder/decoder (CODEC) 215 is capable of processing audio and video encoded in accordance with the Moving Picture Expert Group (MPEG), such as MPEG-1 Layer 3 (MP3) or MPEG 2 Advanced Audio Coding (AAC) or other formats of the like.

The various elements of the exemplary wireless handset, for example the processor, memory, inputs, outputs are disposed generally in a housing. The display is often mounted on the housing whether it is a part of a one piece assembly, or a multiple piece assembly where the housing elements move relative to one another. The housings may also include a keypad or keypads. The location and arrangement of these exemplary wireless handset elements is only an exemplary application and is immaterial to the presentation of the communications received at the device, which are discussed more fully below.

Figure 3:
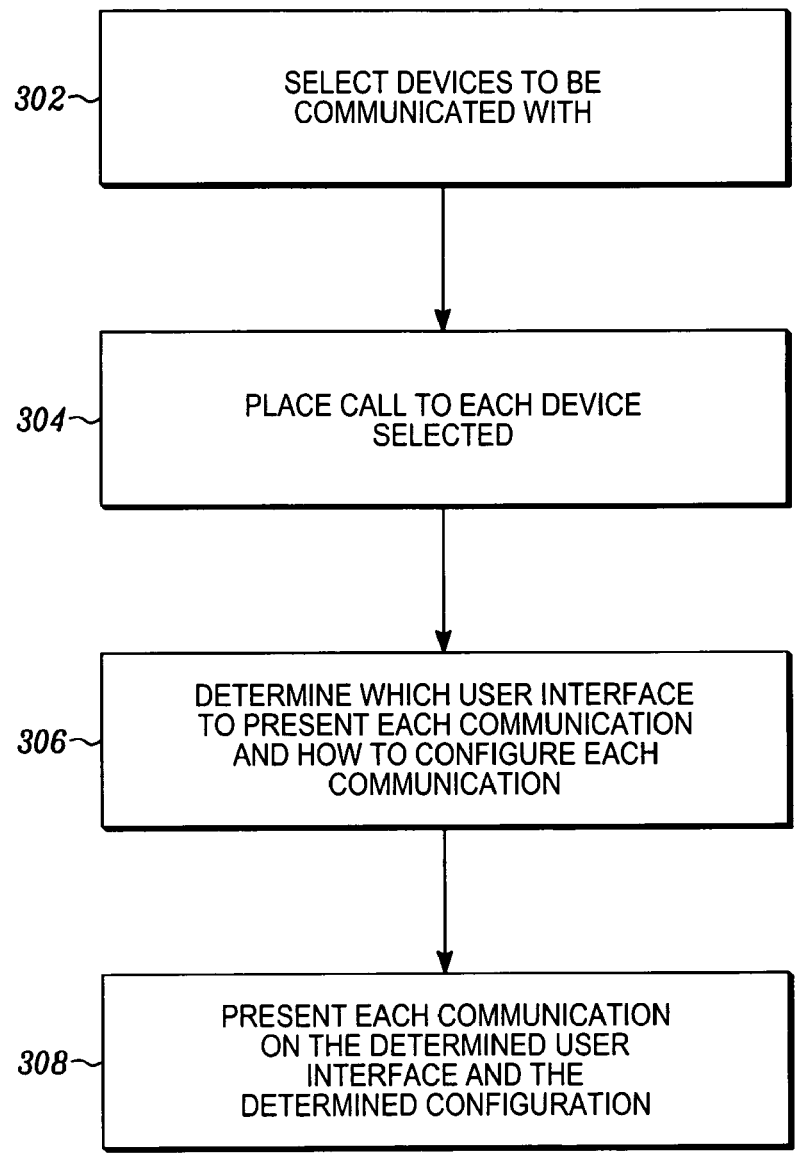
FIG. 3 is an exemplary flow diagram for presenting and configuring communications.

One exemplary method is illustrated in FIG. 3 by a flowchart showing the presentation of a plurality of communications on a wireless communication device. In step 302, each device to be communicated with is selected on the wireless communication device 100 through a software menu. It is to be understood by skilled artisans that the selection of contacts through the use of a user interface may be accomplished in numerous ways. The operation used to select the contact is immaterial to the present invention. In this exemplary embodiment, the devices to be communicated with are selected from a contact list. A group list may also used to select the devices to be communicated with as it is groupings of contacts from the contact list. A combination of contacts and a group list may also be used.

Once the desired contacts are selected, a call is placed, in step 304 to all desired contact devices and the device establishes communication links therewith. Each contact device that is capable of video communications may stream video from its device to the wireless communication device. The wireless communication device 100 determines 306 the user interface to present the communications by and the configuration to use. The wireless device 100 then presents 308 each of the communications by the determined user interface and configuration on the user interface.

In another embodiment, the wireless communication device 100 receives the calls from other devices accepting a call from each device individually. The conference call may also be established by placing and receiving incoming calls to form the group call. In another embodiment, a "video" button (a soft key/menu selection or hard key) or push-to-video button will bring up multiple video images on the display, with all images streaming simultaneously. The user may select through the wireless device 100 or system, manually or automatically, some of the users to be audio only, while others remain streaming video. This may be done via a menu selection, or touch screen on/off (i.e. touch the images to keep, double touch images to send to audio or, revert to a list of users in a menu and choose those for audio or video.

In yet another embodiment, the user may select a "private video" conference with one or more devices already in the group call during the simultaneous video/audio conference. And in yet another exemplary embodiment, the communications may be configured or formatted such that the user may choose between several video streaming talk groups via the wireless device menu or the push-to-video button. The device may configure, manually or automatically, by virtually deleting video or audio users. This may include users who rarely communicate in the group for example or this may include users who have not communicated for a period of time (as determined by system or device). These users (who are still a part of the communications channel) may be virtually added back in if they become active. For example, only three people are dominating the video discussion, so only those three appear on the wireless communication device 100. A fourth person starts talking, and now that streaming image appears with the others on the device 100.

Configuring the presentation of the communications may be based on a formula or threshold taking into account characteristics of each communication. For example, the device 100 may configure to shift an on screen video stream to audio (i.e. there is a formula that determines how much the others are transmitting to decide to show video or audio). For very large talk groups, the presentation configuration may be prioritized based on, phone number, ID, rank, typical past usage—such that 50 video streams do not show up on display all at once.

Another exemplary configuration may be to start all communication in an audio only format, and only add video as discussed above or selected by the user. Other criteria that may be used to determine configuration may be velocity or location such as when in a moving vehicle, only audio is presented. When in a certain location (or velocity) only show certain video, and the rest audio (example, when at home, only audio; when at work, video). The method therefore would comprise for example choosing audio mode only when the device detects a predetermine velocity, rate of acceleration or predetermined location.

In one embodiment the device 100 may reduce resolution of certain streams based the above communication characteristics. For example, one person not talking much starts turning fuzzy or the frame rate slows down. In another exemplary embodiment, the device 100 has multiple displays. Video streaming of a sub group (at least one communication) is presented on one screen, while an alternate sub group (or the rest of the group) is presented on another screen. (example two people video stream to external CLI, while the other four in the group are presented on the first display. In one exemplary embodiment may only seen when the flip is open in a clam shell type communication device.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method for presenting multiple communications in a wireless communication device comprising:
   receiving a plurality of communications in the wireless communication device;
   presenting the plurality of communications concurrently with at least one output device of the wireless communication device, wherein each of the plurality of communications has a common communication type;
   formatting, in the wireless communication device receiving the plurality of communications, said plurality of communications on said at least one output device as a function of a number of communications of said plurality of communications and a function of a communication characteristic; and
   changing format when audio of a first communication stream is greater than a predetermined threshold;
   wherein the step of formatting comprises formatting a first video communication of said plurality of communications such that said first video communication has a different format characteristic than a remainder of said plurality of communications based upon the communication characteristic;
   wherein the different format characteristic comprises a higher frame rate for the first video communication when audio of the first communication stream is greater than the predetermined threshold and a lower frame rate for the remainder of said plurality of communications.

2. The method according to claim 1, further comprising changing a format of presentation in response to a change in the communication characteristic.

3. The method according to claim 1, further comprising changing a format of a first communication stream based on a status criteria.

4. The method of claim 1, further comprising:
   presenting at least one video communication on a display of said wireless communication device simultaneously with said remainder of said plurality of communications.

5. The method of claim 4, further comprising:
   presenting at least one audio only communication with a speaker of said wireless communication device concurrently with said at least one video communication, wherein said at least one audio only communication is not associated with said at least one video communication.

6. The method of claim 5, further comprising:
   formatting said plurality of communications depending on a type of communication.

7. The method of claim 6, further comprising:
   formatting a plurality of video communications such that all video communications of said plurality of video communications are displayed concurrently on said display.

8. The method of claim 7, wherein the step of formatting occurs in response to a presence of audio associated with said first video communication.

9. The method of claim 8, wherein said different format characteristic further comprises one of a larger display area, a change in video resolution, or a different color border.

10. A method of altering a presentation of a plurality of communications of a common type in a portable communication device comprising:
    presenting said plurality of communications of the common type on at least one output device of said portable communication device; and
    formatting, in the wireless communication device receiving the plurality of communications at least a first communication of said plurality of communications, of the common type with a first set of format characteristics in response to a first condition, the formatting having a first video communication having audio associated therewith having a differentiating format characteristic relative to a second video communication not having audio associated therewith;
    wherein the first set of format characteristics comprises a higher frame rate for the first video communication with audio and a lower frame rate for the second video communication.

11. The method of claim 10, formatting said first communication of said plurality of communications of the common type with said first set of format characteristics when said first communication has audio associated therewith and a second communication, not associated with said first communication does not have audio associated therewith.

12. The method of claim 10, further comprising choosing audio mode only when the device detects a predetermine velocity, rate of acceleration or predetermined location.

13. The method of claim 10, wherein a sending device determines a format for viewing on the portable communication device.

14. A method of altering a presentation of a plurality of conference call communications in a portable communication device comprising:
    presenting said plurality of conference call communications on at least one output device of said portable communication device, wherein said plurality of conference call communications comprises at least two video communications and at least one audio communication not associated with at least one video communication;
    formatting a first video communication of said at least two video communications such that said first video communication has a differentiating characteristic from a remainder of said plurality of conference call communications when at least a first condition has been met and in response to a communication characteristic,
    wherein the formatting occurs in the portable communication device,
    wherein said first condition comprises a threshold audio being received with the first video communication,
    wherein said differentiating characteristic is a colored border presentation different than other video communications presented by a display of the portable communication device and a higher frame rate for the first video communication when the threshold audio is received and a lower frame rate for the remainder of said plurality of conference call communications.

15. The method of claim 14, wherein said differentiating characteristic is removing said first video communication from a display.

* * * * *